United States Patent [19]

van Lith

[11] Patent Number: 4,854,919

[45] Date of Patent: Aug. 8, 1989

[54] INFINITELY VARIABLE TRANSMISSION WITH A CORRECTED PULLEY ALIGNMENT

[75] Inventor: Johannes H. van Lith, Berlicum, Netherlands

[73] Assignee: Van Doorne's Transmissie B.V., Tilburg, Netherlands

[21] Appl. No.: 192,989

[22] Filed: May 12, 1988

[30] Foreign Application Priority Data

May 13, 1987 [NL] Netherlands ..................... 8701134

[51] Int. Cl.⁴ ............................................... F16H 9/12
[52] U.S. Cl. ........................................ 474/25; 474/28
[58] Field of Search ................... 474/11, 12, 8, 17, 18, 474/25, 28–30, 69, 70; 74/861, 865, 867, 868

[56] References Cited

U.S. PATENT DOCUMENTS

| | | | |
|---|---|---|---|
| 3,146,633 | 9/1964 | Schimitter et al. | 474/28 X |
| 4,596,536 | 6/1986 | Okawa et al. | 474/28 X |
| 4,680,991 | 7/1987 | Miyawaki | 474/28 X |

Primary Examiner—Thuy M. Bui
Attorney, Agent, or Firm—Pennie & Edmonds

[57] ABSTRACT

Infinitely variable transmission comprising a primary pulley fitted on a drive-shaft and a secondary pulley fitted on a driven shaft, both pulleys consisting of two conical opposed discs of which one is movable along the shaft on which it is fitted, a V-belt being looped over both pulleys, wherein the center lines of the pulleys are offset when the transmission is in its medium position and are in line when the transmission is the lower ratio range.

2 Claims, 1 Drawing Sheet

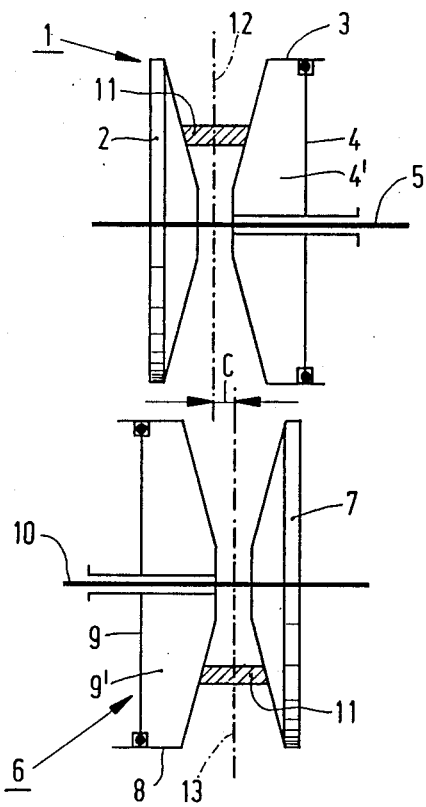
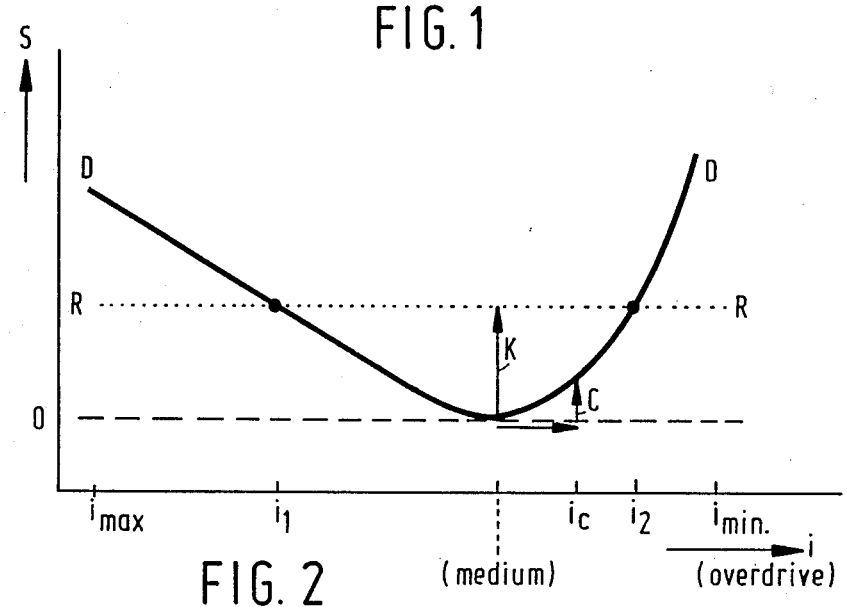

INFINITELY VARIABLE TRANSMISSION WITH A CORRECTED PULLEY ALIGNMENT

The invention relates to an infinitely variable transmission with a corrected pulley alignment, comprising a primary pulley fitted on a drive-shaft, said pulley consisting of a conical disc fixed to the drive-shaft, and of a conical disc axially movable relatively to the drive-shaft, whereby the two conical discs enclose a V-shaped groove; a secondary pulley to be fitted on a shaft to be driven, said pulley consisting of a conical disc fixed to the shaft to be driven, and of a conical disc axially movable relatively to the shaft to be driven, whereby the two conical discs enclose a V-shaped groove and whereby the drive-shaft and the shaft to be driven are positioned axially parallel at a radial distance and the axial positioning of the fixed and the movable disc on the drive-shaft is opposed to that on the shaft to be driven; an endless transmission means provided in the grooves of the primary pulley and the secondary pulley, whereby the centre line of the V-shaped groove of the primary pulley, in the position of the endless transmission means where the radial distance of the endless transmission means in the primary pulley to the centre line of the drive-shaft and the radial distance of the endless transmission means in the secondary pulley to the centre line of the shaft to be driven are equal, is axially displaced, relatively to the centre line of the V-shaped groove of the secondary pulley, over a distance (C) in the direction of the movable disc of the secondary pulley.

Such a transmission is known from the U.S. Pat. No. 4,596,536. In this known transmission, which is especially intended for use in cars, the desired transmission ratio is adjustable by simultaneously changing the width of the V-shaped grooves of the primary pulley and the secondary pulley such that the V-shaped groove of the one pulley becomes wider and that of the other pulley becomes narrower. As a result of this the radial position of the endless transmission means is changed in both pulleys and with it the transmission ratio. The radial alteration of the position of the endless transmission means is accompanied by an axial displacement of the endless transmission means. The axial displacement of the endless transmission means in the primary pulley is not equal to that in the secondary pulley, however, because of the geometric construction of the transmission and the fixed length of the endless transmission means. The endless transmission means will constantly run out of alignment, therefore, except with that transmission ratio for which the transmission has been aligned, i.e. for which the centre lines of the V-shaped grooves of the primary and the secondary pulley have been placed in line. The degree of misalignment for a transmission which has been aligned in the 1:1 or medium transmission ratio, in which the radial position of the endless transmission means is equal in both pulleys, can be approximated by the equation:

$$S = \frac{D^2}{\pi L} \left( \frac{i-1}{i+1} \right)^2 \tan\alpha$$

in which
S is the degree of misalignment
D is the diameter of the curved path of the endless transmission means in the pulleys in the medium position
L is the distance between the drive-shaft and the shaft to be driven
i is the momentary transmission ratio (input speed/output speed)
α is the semi-angle of the V-shaped groove of the pulleys.

The misalignment is undesired from a point of view of load and life of the transmission and of the endless transmission means. In the afore-mentioned U.S. patent specification it was proposed, therefore, to limit the maximum occurring misalignment by axially displacing the centre line of the V-shaped groove of the primary pulley relatively to the V-shaped groove of the secondary pulley in the direction of the movable disc of the secondary pulley along a distance $$\frac{D^2}{2\pi L} \left( \frac{i_{max} - 1}{i_{max} + 1} \right)^2 \tan\alpha$$

in which imax is the maximum transmission ratio of the transmission in question. As a result of this measure the maximum occurring misalignment is indeed limited, but not reduced by half in all cases, as was proposed. This is a consequence of the fact that the approximation equation of the misalignment is not a symmetric equation and, besides, of the fact that the range of the equation is dependent on the adjustment of the transmission with regard to the maximum and the minimum admissible input or engine speed. The maximum misalignment does not necessarily occur with the maximum transmission ratio, therefore. The pulley alignment correction according to the U.S. patent specification improves the load and the life of both the entire transmission and the separate endless transmission means insufficiently thereby.

The purpose of the invention is to obviate said drawbacks.

For that purpose an infinitely variable transmission of the above kind is therefore characterized, according to the invention, in that the distance (C) of the axial displacement of the centre line of the primary pulley is such that the centre line of the V-shaped groove in the primary pulley and the centre line of the V-shaped groove in the secondary pulley are in alignment with a transmission ratio (ic) whereby the radial distance of the endless transmission means in the primary pulley to the centre line of the drive-shaft is greater than the radial distance of the endless transmission means in the secondary pulley to the centre line of the shaft to be driven.

As a result of this measure the maximum misalignment of the endless transmission means is indeed usually larger than with the correction according to the U.S. Pat. No. 4,596,536, but with the correction according to the invention the misalignment is zero or greatly limited in those transmission ratios which are most frequent in the transmission during operation, i.e. the low transmission ratios which are comparable with a third, fourth or fifth gear of a manual transmission. The alignment correction according to the invention limits, during the larger part of the operating time, the disadvantageous load applied to the endless transmission means because of misalignment and extends the life of the endless transmission means and the transmission considerably therewith.

BRIEF DESCRIPTION OF THE DRAWINGS

The invention will be explained hereinafter with reference to a drawing. In the drawing:

FIG. 1 is a diagrammatic view of an infinitely variable transmission according to the invention, in the medium position with alignment correction C and FIG. 2 diagrammatically illustrates the trend of the alignment error of a transmission, aligned in medium position without alignment correction.

DETAIL DESCRIPTION OF THE DRAWINGS

The infinitely variable transmission according to FIG. 1 comprises a primary pulley 1 which is fitted on a drive-shaft 5. The primary pulley 1 consists of a first conical disc 2 fixed to the shaft 5 and a second conical disc 3 axially movable on the shaft 5. The axially movable disc 3, together with a plate 4 fixed to the shaft 5, form a cylinder-piston combination having a closed cylinder chamber 4'.

The transmission also comprises a secondary pulley 6 with a conical disc 7 fixed to the shaft 10 and a conical disc 8 fitted axially movable on the driven shaft 10. The disc 8, together with a plate 9 fixed to the shaft 10, form a cylinder-piston combination having a closed cylinder chamber 9'.

The shafts 5 and 10 are provided axially parallel at radial distance. The conical discs of the primary pulley 1 and the secondary pulley 6 respectively enclose V-shaped grooves in which an endless transmission means 11 is provided. Said endless transmission means 11 may be a conventional V-belt, but e.g. in particular also a metal drive belt as is i.a. described in the European Patent Specification No. 0014013. The transmission ratio of the transmission is dependent on the ratio between the radial position of the endless transmission means 11 in the V-shaped groove of the secondary pulley 6 and that in the V-shaped groove of the primary pulley 1. The transmission ratio of the transmission can be altered by increasing the width of the V-shaped groove of the one pulley and decreasing that of the other pulley. The endless transmission means 11 will radially move in the V-shaped groove of the two pulleys thereby, as a result of which the transmission ratio will be altered. Widening and narrowing the V-shaped grooves is usually effected by reducing, increasing respectively a control pressure of a hydraulic medium in the cylinder chamber 4', whilst in the cylinder chamber 9' a lower tension pressure is applied by means of a hydraulic medium, which lower tension pressure ensures that sufficient tensile force is constantly exerted on the endless transmission means.

Because of the specific geometric construction of the transmission casu quo the discs the radial displacement of the endless transmission means 11 is accompanied by an axial displacement. Said axial displacement of the endless transmission means in the primary pulley 1 and in the secondary pulley 6 is not equal, because of the geometric constructon of the transmission and the fixed length of the endless transmission means 11. This means that the endless transmission means constantly runs slightly out of alignment, except in those transmission ratios for which the transmission has been aligned, i.e. in which the centre line 12 of the V-shaped groove of the primary pulley is in line with the centre line 13 of the V-shaped pulley of the secondary pulley 6. Such a misalignment is undesired from a point of view of life and load for both the entire transmission and the separate endless transmission means.

In the past the transmissions were usualy aligned in the 1:1 or medium transmission ratio, i=1, i.e. that the centre lines of the V-shaped grooves of the primary pulley 1 and the secondary pulley 6 are in line in the medium position. In that position the endless transmission means runs in alignment but in every other transmission ratio it runs out of alignment. In that case the degree of misalignment can be approximated with the equation $$\frac{D^2}{\pi L} \left( \frac{i-1}{i+1} \right)^2 \tan\alpha,$$

in which D is the diameter of the curved path of the endless transmission means in the pulleys in the medium position, i is the momentary transmission ratio, L is the distance between the drive-shaft 5 and the shaft to be driven 10, and $\alpha$ is the semi-angle of the V-shaped groove of the pulleys. The trend of said misalignment S is illustrated as a function of the transmission ratio in the graph D—D of FIG. 2. From the graph of FIG. 2 it appears that indeed the endless transmission means runs in alignment in the medium position only and constantly runs out of alignment in the same direction in the other positions and assumes great values thereby.

In the U.S. Pat. No. 4,596,536 it has been proposed, therefore, to reduce the large degree of misalignment by half by axially displacing the centre line of the V-shaped groove of the primary pulley 1, in the medium position of the transmission with respect to the centre line of the V-shaped groove of the secondary pulley 6 in the direction of the movable disc 8 of secondary pulley 6, along a distance K which is equal to $$\frac{D^2}{2\pi L} \left( \frac{i_{max} - 1}{i_{max} + 1} \right)^2 \tan\alpha$$

in which imax is the maximum transmission ratio in which the transmission can be put. The alignment correction K is illustrated in FIG. 2 by means of the dotted line R—R. The transmission is now aligned in two transmission ratios i1 and i2, such that the endless transmission means runs in alignment therein whilst the maximum degree of misalignment has been reduced and the endless transmission means runs out of alignment in the one or the other direction, dependent on the transmission ratio. This manner of alignment is greatly arbitrary, however, because the alignment graph is not symmetric around the medium position and the maximum and minimum transmission ratios do not produce the same alignment error and consequently there can certainly be no mention of a real halving of the misalignment. This is even reinforced by the fact that no allowance has been taken for the adjustment of the minimum and the maximum acceptable engine speed or the input speed of the transmission as a result of which the adjustment range, the range of the transmission ratios is also determined. With this alignment correction the load and the life are not strongly improved, therefore.

In the invention it has been recognized, however, that during the larger part of the operating time the transmission in operation is in a transmission ratio between the medium (i=1) and the minimum (imin) casu quo overdrive position, corresponding with the third, fourth and fifth gear of a manual transmission, and that an alignment in this range will produce a considerably improved load pattern and a longer life of the transmission and the endless transmission means. It appears, therefore, that not the maximum misalignment but especially the misalignment in connection with the time lapse during which said misalignment takes place determines the life and the load.

The most suitable transmission ratio, whereby the centre lines of the V-shaped pulleys of the primary and the secondary pulley should be in alignment, which transmission ratio should be between the medium transmission ratio (i=1) and the minimum transmission ratio (imin) casu quo overdrive, is i.a. dependent on the extent of the further adjustment of the transmission and in particular on the specific use of the transmission which determine what transmission ratio the transmission will be in during the larger part of its useful life.

According to the invention a very suitable alignment is obtained, however, by bringing the centre lines of the V-shaped pulleys of the primary and the secondary pulley in line with the top transmission ratio, i.e that transmission ratio in which the power to be transferred is maximal. In any case such an alignment in top appears to be quite satisfactory within the range between medium and overdrive.

In order to obtain the required alignment according to the invention it is only necessary to make sure, when mounting the pulleys on the shafts, that in the medium position the centre line of the V-shaped groove of the primary pulley is axially displaced relatively to the centre line of the V-shaped groove of the secondary pulley in the direction of the movable disc of that secondary pulley, and that said displacement is equal to a distance C which can be calculated from $$\frac{D^2}{\pi L} \left( \frac{ic - 1}{ic + 1} \right)^2 \tan\alpha$$

in which ic is the desired transmission ratio for which the centre lines of the V-shaped grooves of the primary and the secondary pulley should be in alignment and is e.g. the transmission ratio in which the transmission for the specific use operates during an important part of its operating time.

It will be apparent that after the foregoing various modifications of the invention will be obvious to the person skilled in the art. Such modifications are considered to be within the scope of the invention.

I claim:

1. Infinitely variable transmission with a corrected pulley alignment, comprising a primary pulley fitted on a drive-shaft, said pulley consisting of a conical disc fixed to the drive-shaft, and of a conical disc axially movable relatively to the drive-shaft, whereby the two conical discs enclose a V-shaped groove having a centre line; a secondary pulley fitted on a shaft to be driven, said pulley consisting of a conical disc fixed to the shaft to be driven, and of a conical disc axially movable relatively to the shaft to be driven, whereby the two conical discs enclose a V-shaped groove having a centre line and whereby the drive-shaft and the shaft to be driven are positioned axially parallel at a radial distance and the axial positioning of the fixed and the movable disc on the drive-shaft is opposed to that on the shaft to be driven;

an endless transmission means provided in the grooves of the primary pulley and the secondary pulley, whereby the centre line of the V-shaped groove of the primary pulley, in the position of the endless transmission means where the radial distance of the endless transmission means in the primary pulley to the centre line of the drive-shaft and the radial distance of the endless transmission means in the secondary pulley to the centre line of the shaft to be driven are equal, is axially displaced, relatively to the centre line of the V-shaped groove of the secondary pulley, over a distance (C) in the direction of the movable disc of the secondary pulley, characterized in that the distance (C) of the axial displacement of the centre line of the primary pulley is such that the centre line of the V-shaped groove in the primary pulley and the centre line of the V-shaped groove in the secondary pulley are in alignment with a transmission ratio (ic) whereby the radial distance of the endless transmission means in the primary pulley to the centre line of the drive-shaft is greater than the radial distance of the endless transmission means in the secondary pulley to the centre line of the shaft to be driven.

2. Infinitely variable transmission according to claim 1, characterized in that the specific aligning position, for which the centre lines of the V-shaped grooves of the primary and the secondary pulley are in line, is the position in which the maximum power can be transferred.

* * * * *